United States Patent
Kubik et al.

(10) Patent No.: US 10,079,749 B2
(45) Date of Patent: Sep. 18, 2018

(54) IDENTIFICATION OF TRACEROUTE NODES AND ASSOCIATED DEVICES

(71) Applicant: SOLARWINDS WORLDWIDE, LLC, Austin, TX (US)

(72) Inventors: Tomas Kubik, Litomysl (CZ); Lan Li, Austin, TX (US); Tomas Rybka, Brno (CZ); Karlo Zatylny, Dripping Springs, TX (US); Chris O'Brien, Austin, TX (US)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 60 days.

(21) Appl. No.: 15/261,315

(22) Filed: Sep. 9, 2016

(65) Prior Publication Data

US 2018/0077043 A1    Mar. 15, 2018

(51) Int. Cl.
*H04L 12/26* (2006.01)
*H04L 12/24* (2006.01)
*H04L 12/751* (2013.01)
*H04L 12/707* (2013.01)

(52) U.S. Cl.
CPC .............. *H04L 43/12* (2013.01); *H04L 41/12* (2013.01); *H04L 43/10* (2013.01); *H04L 45/02* (2013.01); *H04L 45/24* (2013.01)

(58) Field of Classification Search
CPC ......... H04L 43/12; H04L 41/12; H04L 45/02; H04L 45/24
See application file for complete search history.

(56) References Cited

U.S. PATENT DOCUMENTS

| | | | |
|---|---|---|---|
| 7,733,769 B1* | 6/2010 | Jennings | H04L 47/724 370/229 |
| 2009/0122697 A1 | 5/2009 | Madhyasha et al. | |
| 2009/0135728 A1* | 5/2009 | Shen | H04L 43/12 370/250 |
| 2011/0286447 A1* | 11/2011 | Liu | H04L 45/74 370/389 |
| 2012/0207161 A1 | 8/2012 | Uppalli et al. | |
| 2014/0229612 A1 | 8/2014 | Chandrashekar et al. | |
| 2015/0215206 A1* | 7/2015 | Solis | H04L 45/742 370/252 |

OTHER PUBLICATIONS

Hamed Haddadi et al., "Network Topologies: Inference, Modeling, and Generation", IEEE Communications Surveys & Tutorials, 2nd Quarter 2008, vol. 10, No. 2, pp. 48-69.

(Continued)

*Primary Examiner* — Duc C Ho
(74) *Attorney, Agent, or Firm* — Squire Patton Boggs (US) LLP (57) ABSTRACT

Various embodiments pertain to communication network systems. In particular, various embodiments relate to multi-path probing in communication network systems that can be used to estimate the complete topology of the network. A method includes receiving data at a source node from a tracerouting probe in a network. The data includes information about at least one network node. The method also includes determining an identification for the at least one network node based on information. In addition, the method includes using the identification of the at least one network node to determine an identification of at least one device.

31 Claims, 9 Drawing Sheets

(56) References Cited

OTHER PUBLICATIONS

Xing Jin et al., "Scalable and Efficient End-to-End Network Topology Inference", IEEE Transactions on Parallel and Distributed Systems, vol. 19, No. 6, Jun. 2008, pp. 837-850.
Bin Yao et al., "Topology Inference in the Presence of Anonymous Routers", XP-002320919, IEEE, 2003, pp. 353-363.
European Search Report application No. 17190455.0 dated Dec. 11, 2017.
European Office Action dated Jun. 27, 2018, issued in corresponding EP Application No. 17 190 455.0-1216.

* cited by examiner

$$S.E._{(N)} = \sqrt{\frac{(c-1)\left(\sum_{i=2}^{c} m_i \sum_{j=1}^{i-1} n_j\right)^2 + \sum_{i=2}^{c} m_i^2 n_i \left[\left(\sum_{i=2}^{c} \sum_{j=1}^{i-1} n_j\right)^2 + \left(\sum_{i=2}^{c} \sum_{j=1}^{i-1} n_j\right)^2\right]}{N^3}}$$

410

, or $$S.E._{(1/N)} = \sqrt{\frac{(c-1)\left(\sum_{i=2}^{c} n_i \sum_{j=1}^{i-1} n_j\right)^2 + \sum_{i=2}^{c} m_i^2 n_i \left[\left(\sum_{i=2}^{c} \sum_{j=1}^{i-1} n_j\right)^2 + \left(\sum_{i=2}^{c} \sum_{j=1}^{i-1} n_j\right)^2\right]}{1}}$$

IDENTIFICATION OF TRACEROUTE NODES AND ASSOCIATED DEVICES

BACKGROUND

Field

Various embodiments pertain to communication network systems. In particular, various embodiments relate to multi-path probing in communication network systems that can be used to estimate the complete topology of the network.

Description of the Related Art

A variety of networks use multi-path routing to connect source nodes and target nodes within the network. Multi-path routing is a routing technique of using multiple alternative paths through a network between two points in the network. The path created in the network includes at least one intermediate network node, located between the source node and the target node, and an edge, which is used to connect the various network nodes in the path. In multi-path routing, each path includes at least one edge and at least one network node. The multiple alternative paths in the network can often at least partially overlap, so that the paths share at least one edge and/or at least one node.

Some networks using multi-path routing can employ tracerouting. Tracerouting is a network diagnostic tool that may be used to record routes through the network. Tracerouting involves the sending of information from each intermediate network node in the network back to the source node. This signaling can allow the source node to track a routing of a signal through the network to the target node.

Using multi-path routing can yield a variety of benefits to the network, such as fault tolerance, increased bandwidth, or improved security. Building a complete network topology, however, may require a complete tracing or mapping of all possible routes in the network. Such a complete tracing or mapping may utilize a significant amount of network resources, including time and bandwidth.

SUMMARY

A method, in certain embodiments, may include receiving data at a source node from a tracerouting probe in a network. The data includes information about at least one network node. The method may also include determining an identification for the at least one network node based on information. In addition, the method may include using the identification of the at least one network node to determine an identification of at least one device.

According to certain embodiments, an apparatus may include at least one memory including computer program code, and at least one processor. The at least one memory and the computer program code may be configured, with the at least one processor, to cause the apparatus at least to receive data at a source node from a tracerouting probe in a network. The data includes information about at least one network node. The at least one memory and the computer program code may also be configured, with the at least one processor, at least to determine an identification for the at least one network node based on information. In addition, the at least one memory and the computer program code may also be configured, with the at least one processor, at least to use the identification of the at least one network node to determine an identification of at least one device.

An apparatus, in certain embodiments, may include means for receiving data at a source node from a tracerouting probe in a network. The data includes information about at least one network node. The apparatus may also include means for determining an identification for the at least one network node based on information. In addition, the apparatus may include means for using the identification of the at least one network node to determine an identification of at least one device.

According to certain embodiments, a non-transitory computer-readable medium encoding instructions that, when executed in hardware, perform a process. The process may include receiving data at a source node from a tracerouting probe in a network. The data includes information about at least one network node. The process may also include determining an identification for the at least one network node based on information. In addition, the process may include using the identification of the at least one network node to determine an identification of at least one device.

According to certain embodiments, a computer program product encoding instructions for performing a process according to a method including receiving data at a source node from a tracerouting probe in a network. The data includes information about at least one network node. The method may also include determining an identification for the at least one network node based on information. In addition, the method includes using the identification of the at least one network node to determine an identification of at least one device.

BRIEF DESCRIPTION OF THE DRAWINGS

For proper understanding of the invention, reference should be made to the accompanying drawings, wherein.

DETAILED DESCRIPTION

Certain embodiments can estimate a complete network topology. A complete network topology may be defined as having traced or mapped all of the unique edges in the network. A topology completion ratio may be used, which can indicate a percentage of the complete network topology that may be mapped and reported to a source node. A tracerouting probe may be used to facilitate estimating of the complete network topology. The probe may in some embodiment continuously or discretely map, trace, or capture paths through the network.

In certain embodiments an estimated complete network topology may be used to monitor an end-to-end network performance. In a multi-path network environment, it may be helpful from a monitoring and diagnostic perspective to cover a majority of network paths through which end-to-end traffic flows. This can improve the diagnostic results of the network, and allow the evaluator of the results, for example, a network operator, to make decisions based on the results.

The multi-path probing may be optimized in such a way that the probe can be stopped when a given topology completion target is reached. For example, once a completion threshold of the network topology is met, the probing may be suspended or stopped. Having to trace a complete network topology may be cumbersome, and use a significant amount of network resources. As such, an efficient network topology estimation process may save the network both time and resources. In certain embodiments, the network topology tracing may include a self-evaluation method to estimate the network topology, without needing any operator interference.

In certain other embodiments, multi-path probing may be used to find paths from itself to any given endpoint. A tracerouting probe can be used to collect network performance metrics along the paths to the given endpoint, and trigger the reporting of performance metrics from the different intermediate nodes on the path. Such performance metrics, such as packet loss and latency, may then be used to detect transit traffic problems at least one edge or at least one node on the probe paths. The tracerouting probe in some embodiments can provide for fast path probing.

Once tracerouting is complete, or the tracerouting probe has been terminated, a proper visualization of the network may viewed by a user to investigate any problems associated with the network, for example. While tracerouting can be focused on different paths between nodes, in certain embodiments it may be helpful to determine the identification of the nodes on the different paths. Further, it may also be helpful to determine the relation of the different nodes on the path to the devices in the network. A device may be, for example, a user equipment, a mobile terminal, a base station, an access point, a router, and/or a server, In certain embodiments, just because two different packets may have different paths that include different nodes, having different IP addresses, may not mean that packets have to go through different devices. Each device, for example a router or a server, may have multiple IP addresses assigned to different interfaces. In other words, each device may have more than one node with its own unique IP address. Deciding which interface to use may, in some embodiments, be based on a routing protocol and/or other additional logic, such as load balancing.

Figure 1:
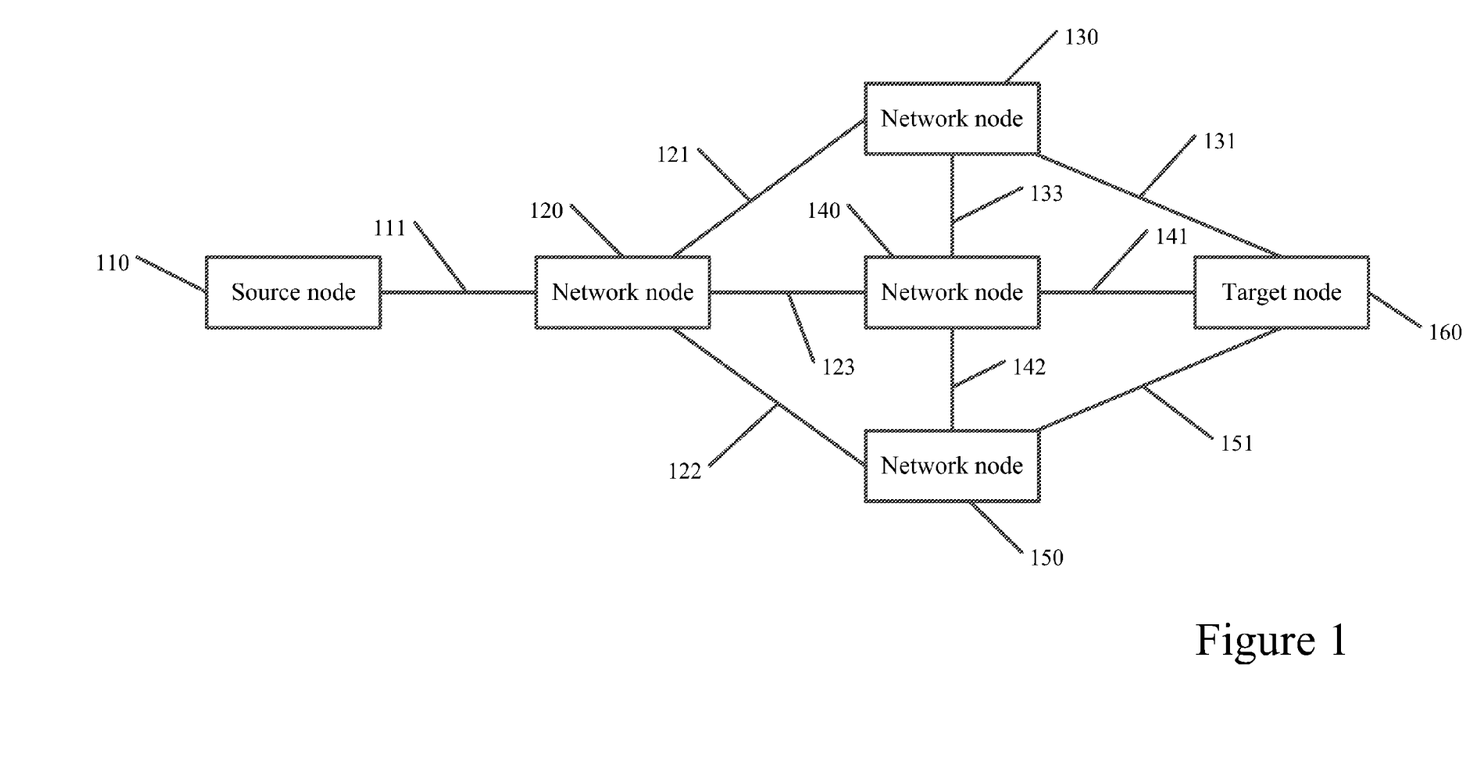
FIG. 1 illustrates a communication system according to certain embodiments.

FIG. 1 illustrates a communication system diagram according to certain embodiments. Specifically, FIG. 1 illustrates a network using multi-path routing between a source node 110 and a target node 160. Source node 110 and target node 160, for example, may be network nodes, access nodes, eNodeBs, servers, hosts, or any of the other access or network nodes discussed herein. In certain embodiments, source node 110 may use a tracerouting probe. The tracerouting probe may be used to detect different routing paths between source node 110 and target node 160. In one example, the probe may begin at source node 110, and then move to network node 120 through edge 111.

An edge may be a wireless, wired, or cloud based connection between two nodes that may be traced or mapped by the probe. When all of the unique edges in a network are found, the network topology may be considered complete. Once the probe reaches network node 120, it can trigger the sending of a message from network node 120 to source node 110. The message may include performance metrics or other information related to edge 111, such as timing information and/or packet loss information. The tracerouting probe may also trigger sending source node 110 any other type of information related to any of the edges or network nodes in the network.

After network node 120, the tracerouting probe may then map or trace one of three different paths. It may continue to network node 130, using edge 121, network node 140, using edge 123, or network node 150, using edge 122. Assuming that the probe moves to network node 130, using edge 121, the tracerouting probe may then again have several different paths it can trace or map. For example, from network node 130, the tracerouting probe may trace edge 131 and continue to target node 160. Alternatively, the tracerouting probe may continue to network node 140 via edge 133, and then to target node 160 via edge 141.

As discussed above, certain embodiments may include the sending of tracerouting probing packets. The nodes along a given traces path, for example intermediate and target nodes, can respond to the probing packets by sending information about the node to source node 110. Similarly, once a probe packet reached target node 160, target node 160 will report information related to target node 160 to source node 110.

Once a tracerouting probe reaches target node 160, the tracerouting probe may start routing another path from source node 110 to target node 160. In certain embodiments the tracerouting probe may continuously trace or map network paths until the estimated network topology reaches a certain threshold. While some of the mapped or traced routes may overlap previously mapped or traced paths, some paths may include new or unique edges. New or unique edges may include edges that have not been previously traced by the tracerouting probes. For example, tracerouting probe may move from source node 111 to network node 120, and then to network node 150, through edge 122, and to target node 160 through edge 151. Edges 122 and 151 are unique edges that have not previously been traced or mapped by the probe.

A complete network topology may include tracerouting of all network nodes 110, 120, 130, 140, and 150. Every node can have its own unique identifier, for example, IP address, domain name, and location or position information on the path that can be used to identify the network node. A complete network topology may also include tracerouting all unique edges in the network. FIG. 1 only illustrates a partially completed topology of the network, in which edges 111, 121, 122, 123, 131, 133, 141, 142, and 151 have been traced or mapped by the tracerouting probe.

Figure 2:
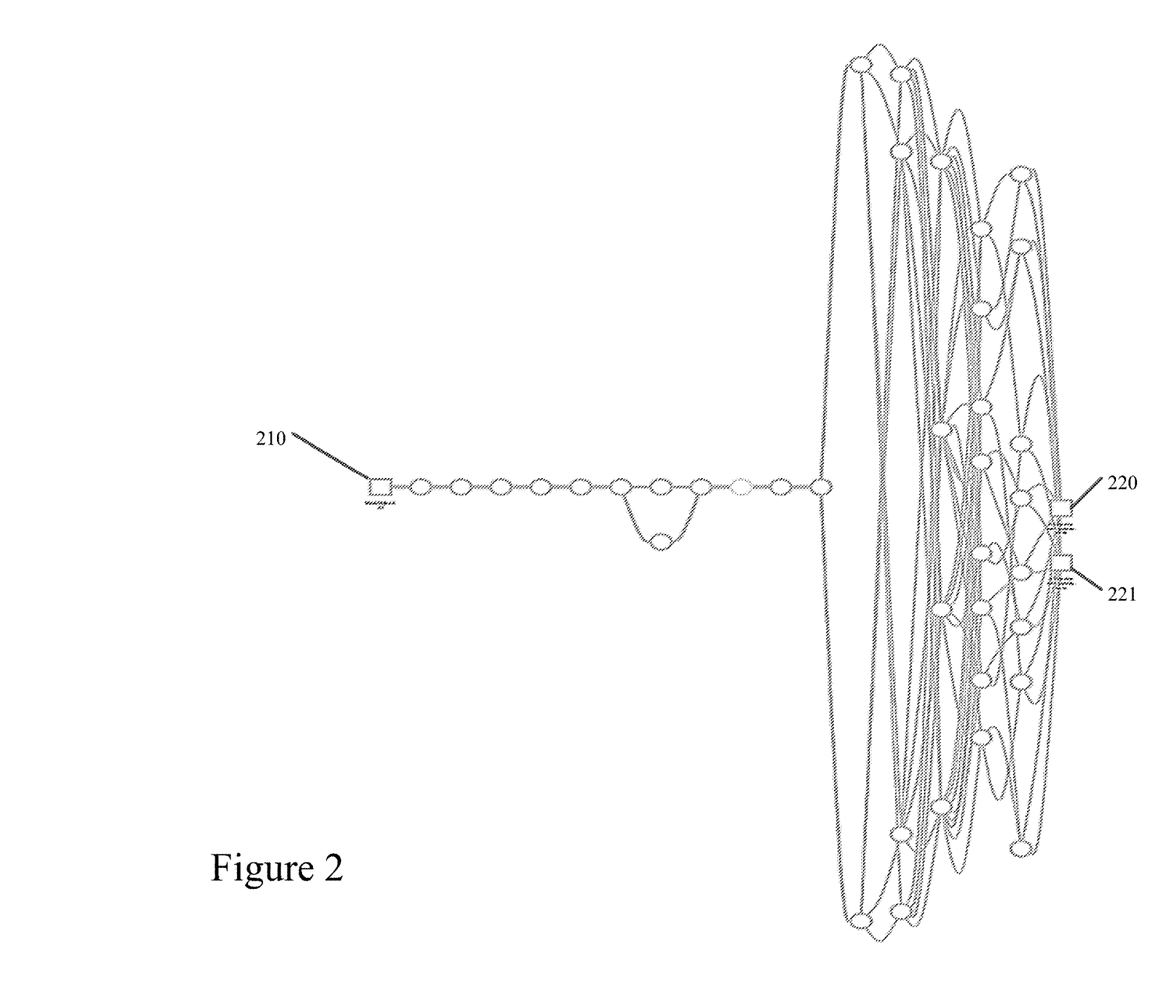
FIG. 2 illustrates a communication system according to certain embodiments.

Tracing a complete network topology may require a significant amount of time, and demand a significant amount of network resources. FIG. 2 illustrates a communication system according to certain embodiments. In particular, FIG. 2 illustrates a multi-path network using a tracerouting probe. The probe attempts to trace paths from source node 210, to target nodes 220, 221. FIG. 2 illustrates 3312 cached unique paths that have been traced or mapped by the tracerouting probe, and reported to source node 210. As previously discussed, having to map a complete network topology may can be cumbersome on the network, and demand a large amount of network resources.

Certain embodiments may therefore include an estimation of the complete network topology. The complete network topology may be estimated using a network topology completion ratio. The network topology completion ratio may be estimated using an edge completion ratio. Performance metrics reported by the tracerouting probe may be converted to, or put in the form of, a per edge metric. For example, the message from the tracerouting probe to the source node may include edge latency and/or edge packet loss. Increasing the number of mapped unique edges can allow for an improved detection rate of traffic problems along the paths between the source node and the target node.

The edge completion ratio may be an estimated ratio of the number of unique edges mapped and reported to the source node. When the edge completion ratio is a hundred percent, the source node contains a complete mapping of the unique edges in the network, and the network topology completion ratio can also be said to be at a hundred percent. In certain embodiments, the edge completion ratio may be defined as the number of unique edges found in the network divided by the estimated total number of unique edges.

In certain embodiments, the edge can be identified based on the network nodes to which the edge is connected. In other words, the identification of the entering node of the edge and the identification of the exiting node of the edge are used to identify the edge itself. In some embodiments, node information may not be available, for example, the node is timed out or the node has a private IP address. As described below, in such embodiments the node information may be determined based on the prefix of the node located before the unavailable node and after the unavailable node. Similarly, the prefix of the entering node and the prefix of the exiting node may be combined to determine the identity of the edge. A source node may determine whether the edge is unique based on an edge identification. In addition, the edge identification can be recorded at the source node using information related to the entering node and the exiting node of a given edge. The edge identification can be used to mark the edges.

When the complete network topology is not known by the source node, one way to calculate the edge completion ratio may be based on mark-release-recapture (MRR) methods. MRR methods, for example, may include capturing, marking, and releasing a first portion of a given population. Then, a second portion of the population is captured, and the number of marked members of the second portion of the population can be counted. Since the number of marked members of the population in the second portion should be proportional to the number of members in the entire population, an estimate of the total number of members within a population size may be obtained. MRR methods may therefore be used to estimate both an entire population, as well as the number of a given member within the population.

Figure 3:
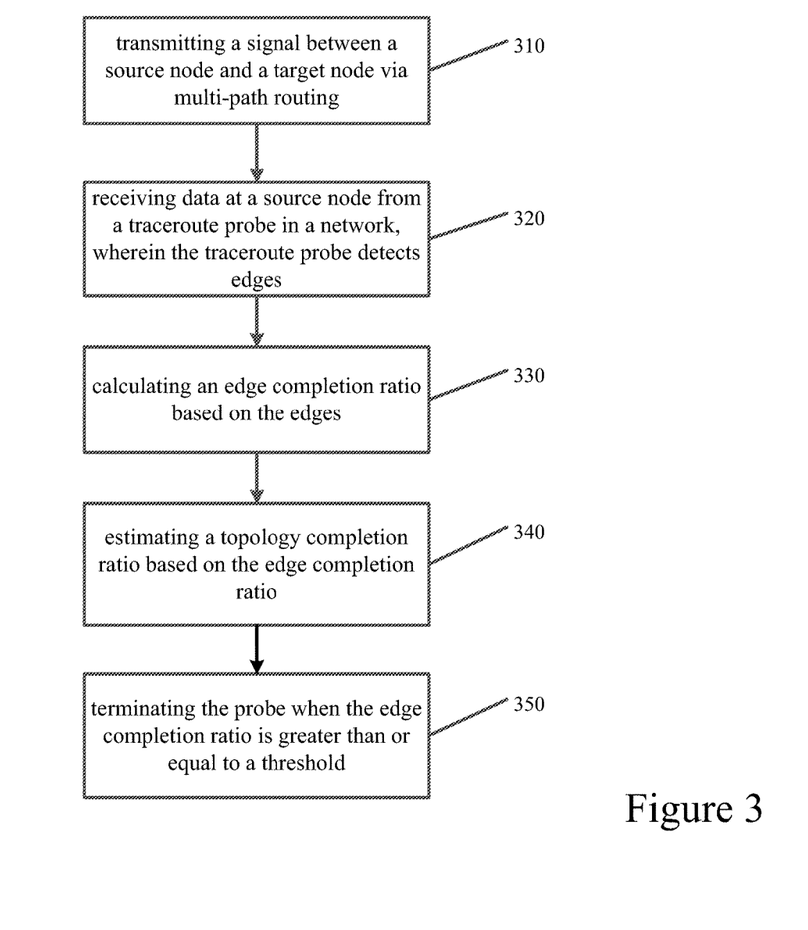
FIG. 3 illustrates a flow diagram according to certain embodiments.

FIG. 3 illustrates a flow diagram according to certain embodiments. In step 310, a signal may be transmitted between a source node and a target node via multi-path routing. Examples of the multi-path routing can be seen in FIGS. 1 and 2. A tracerouting probe may then be used to trace or map at least one edge and at least one node on the path between the source node and the target node. Upon reaching a network node, a tracerouting probe may trigger the transmission of information or data from the network node to the source node, which details at least one edge performance metric. For example, the at least one edge metric may relate to edge latency and/or edge packet loss.

In step 320, the source node receives the data from the tracerouting probe in a network. As previously described, the tracerouting probe maps or traces at least one edge and at least one network node in the network. For every x number of captured paths, x being configurable by the network operator, the source node may identify all unique edges within the x number of paths, and compare them with the previously recorded edges. The number of recaptured edges may also be taken into account by the source node. If the same edge was recaptured multiple times, the recaptured edge will only be counted as one edge. The number of newly identified or unique edges will be added to the recorded edges for the next calculation. The source node may store the recorded edges, for example, in a list.

An estimated edge completion ratio can then be calculated based on the edges, as shown in step 330, using a MRR method. For example, Schnabel and Schumacher-Eschmeyer estimation method may be used as the preferred MRR methods. The estimation equation may in certain embodiments be as follows:

$$N' = \frac{\sum_{i=2}^{c}\left(n_i\left(\sum_{j=1}^{i-1}n_j\right)^2\right)}{\sum_{i=2}^{c}\left(m_i\left(\sum_{j=1}^{i-1}n_j\right)\right)}$$

N' may be an estimation of total number of unique edges from the source node to the target node. $n_i$ may equal the total number of unique edges caught at test i, while $m_i$ may equal the number of recaptured unique edges during test i. c may equal the total number of calculations.

Based on the above calculation, the edge completion ratio may be calculated by dividing the number of unique edges found in the network by the estimated total number of unique edges calculation, an estimation of the total number of unique edges may be determined. This edge completion ratio may then be used to estimate a topology completion ratio, as shown in step 340. The edge completion ratio and/or the topology completion ratio can then be compared to a threshold set by a network operator. For example, the threshold may be 95% in certain embodiments. As shown in step 350, if the edge completion ratio and/or the topology completion ratio is greater than or equal to a threshold, then the tracerouting probe may be terminated.

The threshold may be predetermined by the operator. The higher the threshold, the more network resources may be used for the mapping or the tracing of the complete network topology. If the threshold is too low, on the other hand, then the source node may not be able to accurately gage the complete topology of the network.

Figure 4:
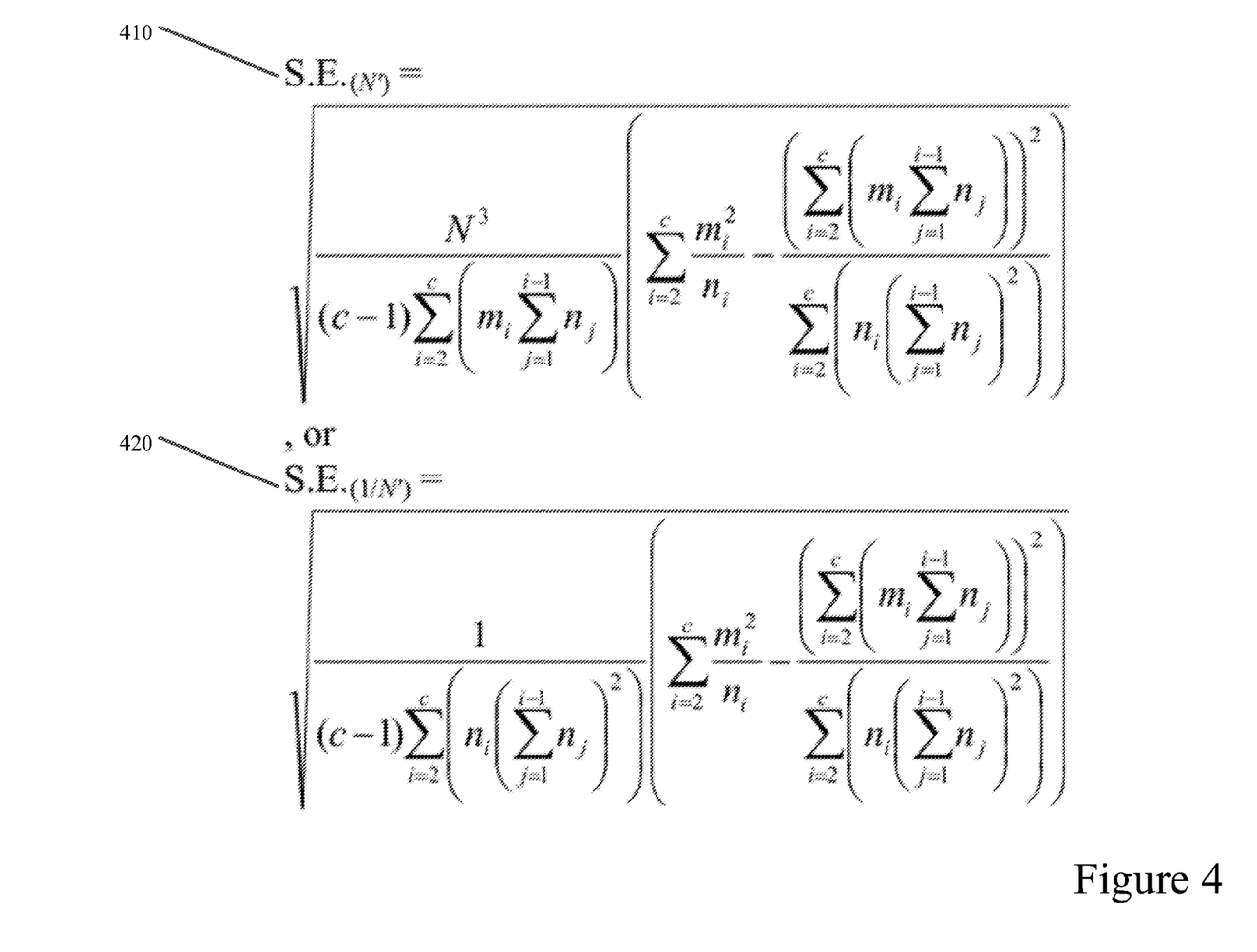
FIG. 4 illustrates equations according to certain embodiments.

In certain embodiments, the confidence limits of Schnabel and Schumacher-Eschmeyer estimates can be calculated using the reciprocal of [N'[1/(1/N'±t(0.05, c−1) S.E.(1/N'))], or by using the formula (N'±t(0.05, c−1) S.E.(N')). The latter formula (N'±t(0.05, c−1) S.E.(N')) may provide for a closer value, including a higher minimum or lower positive maximum, than the former formula. FIG. 4 illustrates equations according to certain embodiments. Specifically, FIG. 4 illustrates S.E. (N') 410 and S.E. (1/N') 420 used in calculating the confidence limits of Schnabel and Schumacher-Eschmeyer.

In some embodiment, the edge completion ratio may be filtered so as to remove hops with only one single edge. Edges that are always included by all paths may be ignored. For example, a first edge, from the source node to its default gateway, may be ignored if the source node has only one default gateway. Ignoring certain edged may be done in order to avoid any distortions to the estimation, and to increase the accuracy of the estimation.

In addition, in certain embodiments a sliding window approach may be used in which only the most recent data can be used for the estimation. The sliding window approach may be used when the source node is constantly probing paths, without having to complete a self-contained test. The sliding window approach includes that the completion ratio estimation can be based on paths collected from the recent time window, known as the sliding window, at any time. This may allow for calculating the ratio more frequently, as well as allowing for the adjustment of the window side.

As discussed above, multi-path traceroute algorithm produces a set of at least partially differing paths from a probing source to a target. Once the tracerouting is completed, a graph of all the different individual paths, which shows the pairing of the nodes in multiple paths that may represent the same network IP interfaces, may be produced. At this phase, paths are only sequences of nodes, whose identification may not even be known. While the IP addresses of the Nodes may be known, no other additional information about the nodes may be known. For example, at least of the Node IDs, Node IP addresses, Edge IDs, domain name system (DNS), performance metrics, or public identification records, may not be known.

In certain embodiments, a node identifier may be calculated for all nodes in the determined tracerouting paths, even if a graph representing the traceroute may be incomplete. In other words, node identification may occur even when some nodes on the path are still missing. In some embodiments, an IP address of a node may be public, such as the IP addresses of nodes routed in the global Internet. When the node IP address is public, the node identity may simply be the node IP address.

In some other embodiments, however, the IP address of a node may be private in accordance with, for example, Request for Comment 1918 (RFC 1918), for Internet Protocol (IP) version 4 (IPv4). The IP address may, in another embodiment, be local according to RFC 4193 for IP version 6 (IPv6). If the IP address of a node is private, it may be helpful to attach a network scope to the IP address, since such an IP address may be assigned in multiple distinct internal networks. To define the network scope, an identifier of the closest preceding node with a public IP address is used. If, however, no such preceding node with a public IP address exists, the identity of the probing source, for example a poller, agent, or other source, is used. In such an embodiment, the path node examined may be part of the probe's internal network, and can be mapped to internal monitoring systems.

In yet another embodiment, the IP address of a node may not be discovered or may be unresponsive. There may, however, be reason to believe that a node exists, for example, because there are signs of a traffic hop at that location, despite the lack or responsiveness of the node. When the node has no IP address or is not responsive, the identifier of the node may include the following: the identity or prefix of the closest preceding responsive node in the path, the identity or prefix of the closest subsequent responsive node in the path, and a position in the sequence of unresponsive nodes between the preceding and subsequent responsive nodes.

In some embodiments, the target node, may in certain embodiments, not be responsive. This can leave the routing path open, without a definitive termination node. In such embodiments, when the target is not responsive, the identifier of the node may include the identity or prefix of the closets preceding responsive node in the path, and/or the identity or prefix of the closest subsequent responsive node in the path. Once all of the nodes in the path are identified, the individual paths may be aligned to nodes with same identifier. These nodes may become junction points in a resulting path graph.

Figure 5:
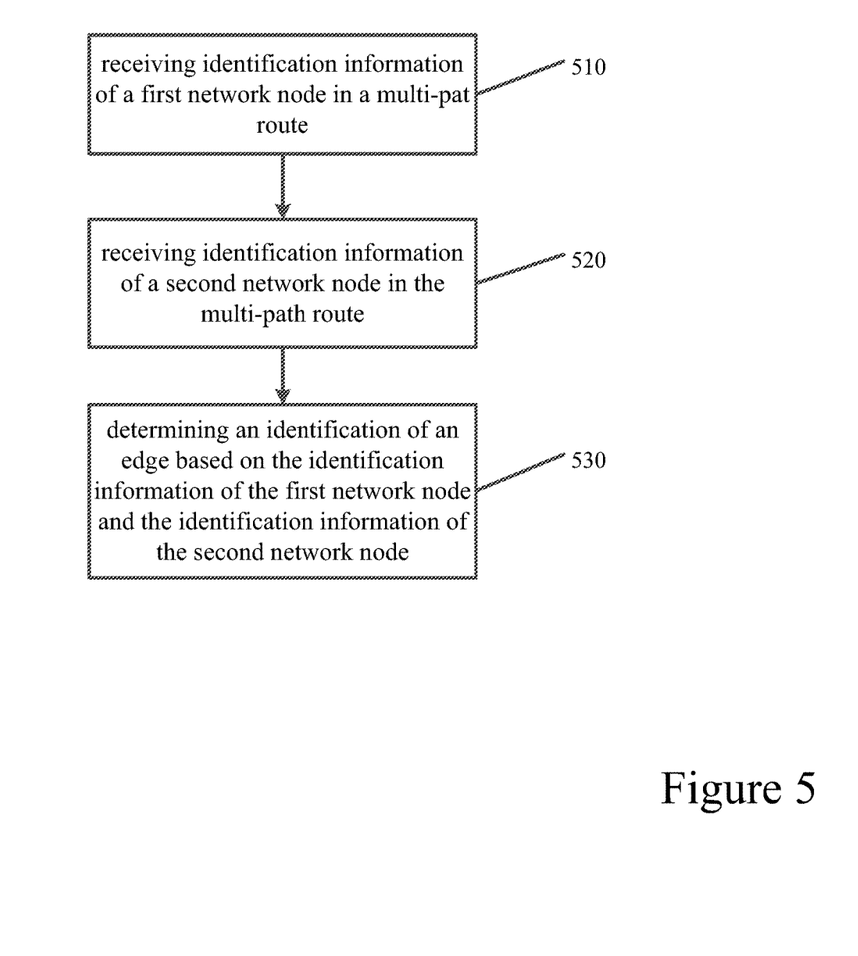
FIG. 5 illustrates a flow diagram according to certain embodiments.

FIG. 5 illustrates a flow diagram according to certain embodiments. Specifically, FIG. 5 illustrates a flow diagram for determining the identification of an edge based on the determined or calculated identification and/or prefix of the entering or exiting nodes. FIG. 5, therefore, may illustrate additional features that may be incorporated into FIG. 3 and/or FIG. 8. In step 510, the source node may receive identification information of a first network node in a multi-path route. The source node may receive the information from a tracerouting probe that can be used for mapping or tracing the network topology. In step 520, the source node may receive identification information of a second network node in the multi-path route. Based on the identification information of the first network node and the second network node, the source node can determine an identification of the edge, as shown in step 530.

The edge identification determined in step 530 may be stored or recorded in the source node. The source node may use the edge identification to determine whether an edge is unique, to estimate the edge completion ratio of the network. As shown in FIG. 3, the edge completion ratio can be used to estimate the complete network topology.

In certain embodiments, in which a Node's IP address may be private, the discovered nodes in the multi-path traceroute may be mapped to data stored in a monitoring system. The stored data may be part of an internal network, which may require a username and/or password to access. The stored data may cover at least part of the internal network of a single device, and may be stored by the user or by automated discovery, which may itself use node reduplication logic. In other words, the data may be used to determine to which device a discovered node belongs. The stored data can include an array or a list of IP addresses per device being monitored. Therefore, the data may be used to map discovered IP addresses to existing devices in a network monitoring system.

All of the IP addresses in the stored data and/or the discovered nodes may be unique in some embodiments. In such embodiments, a node ID is matched to a particular IP address in the stored data, which includes a device's IP array or list. In other embodiments, however, the stored data and/or the discovered nodes may include at least one duplicate IP address. For example, several discovered nodes may be matched to a single device. This may be because the internal network may have several similar network with the same private IP addresses or subnets. In other words, it may not be possible to use the stored data of the management system to map nodes to concrete devices because multiple devices may share the same IP address.

In the embodiment in which multiple devices may share the same IP address, each device in the management system may access interface information, which includes information about the neighbors of the device. The interface information for the at least one neighbor device may be stored along with other stored data of the management system. In some embodiments, the IP address or subnet information of at least one neighboring device may be matched to the IP address of at least one node, or those traceroute nodes nearest to the at least one node. Devices which have multiple interfaces, for example, multiple related subnets, which correspond with the IP addresses of neighbors, can be used for mapping.

As discussed above, certain embodiments may be provided with devices, or an aggregation of nodes within such devices, which have the same count of interfaces as previous traceroute node count. In other words, the particular node ID may be matched to the IP address of a given device, and devices and node IDs are matched. Those interfaces may then be mapped to the correct links, edges, nodes, and/or devices.

Each device or node may have two different interfaces, ingress or egress. An ingress interface may be an interface for data that is entering the device or node, and can be represented on the right side of a link or an edge connected to such a device or node. An egress interface, on the other hand, may be an interface for data that is exiting a device or a node. For example, if a first device and a second device are connected via an edge, the right side of the edge can represent the location of the ingress interface of the second device, while the left side of the edge may represent the egress of the first device.

The Node ID which represents the traceroute node may be the IP address of the ingress interface of the node. While probing is able to identify ingress interfaces of a node or a device, egress interfaces may in some embodiments not be detected by the probe. A single device or node, for example, has multiple egress interfaces, and it may be helpful to determine which of the nodes is connected via a link or an edge to the ingress interface. Routing and topology information included in the stored data of the management system may be used to determine the mapping of the egress interface.

If the identification of the egress interface cannot be determined based on the routing and topology information included in the management system, the identification of the egress interface may be determined based on the identity most similar to the ingress identity. The similarity of the addresses may be determined based on the similarity of the IP addresses of two different interfaces. For example, if the IP address of the ingress interface is 10.0.0.1, and the only two other IP addresses that are known are 10.0.0.5 and 10.0.0.25, the more similar IP address may be 10.0.0.5. This IP address may then be assigned to the egress interface. In some other embodiments, determining the similarity between the ingress and egress interface may include the use of a subnet mask.

In certain embodiments, getting a packet from the probe to the internet may include a first node and a second node. In such an embodiment, a first interface eth0 may be used to access the second node, rather than a second interface eth1, which may be used to access the internet from the second node. The right side of the edge or link between the first and second node may be recognized as an ingress interface of the second node. The IP address of the second node may be, for example, IP 10.0.1.2. In other embodiments the IP address of the second node may have any other Node ID or Node IP address. The ingress interface identification may have been determined or discovered by the probe during tracerouting.

The left side of the edge and/or the link may then be identified. The end point on the left side of the edge may be identified based on the next hop address, for example, the identification of the second node, and/or all of the enumerated interfaces of the current node, such as the first node. The subnet for a particular interface may then be resolved, based on at least the IP address and the subnet mask. A subnet mask may be a 32-bit number that masks an IP address, and divides the IP address into network address and host address. The ID of the first node and ID of the second node may then be fitted to the resolved subnet address. However, if the IDs of the first and the second nodes do not fit, the above may be repeated with the next available interface in the device. If the identifications of the first and the second nodes fit, the interface may be chosen as the egress interface for Node 1.

In certain embodiments, the goal of the above matching between the Nodes IDs and the subnet address may be to determine the end points of a given edge or link. In other words, one the ingress interface and the egress interface of the nodes may be determined, the Node IDs of all of the nodes on the probing path may be determined. In addition, the ingress and egress interface can also be used to determine the number of nodes in a given device.

Once the traceroute leaves the internal network, in some embodiments, the device information contained in a network management system may no longer be available to a lack of administrative access. In such embodiments, a user may still want to determine the identification of the nodes, edges, devices, and the number of nodes located in the different devices. In some embodiments, a node IP address a node DNS name may be used as the Node ID, and/or connectivity between at least two different nodes may be used to determine the Node ID. In certain embodiments, as discussed above, traceroute probing discover the IP address of the ingress interface in which the probing traffic enters the device, but may not determine the IP address of the egress interface. There may therefore not be any information available for which the egress interface connects to the next hop device.

In certain embodiment in which the device has multiple ingress interfaces, the traceroute graph may present each ingress interface IP as a separate node. In some embodiments, this may make the graph more complex than it should be and not representative of the network. To determine which traceroute nodes can be aggregated, several features may be included. For example, the path probing packets may not enter the same device more than once, which may limit the search scope of candidate nodes for aggregation. In some embodiments, devices may have multiple virtual routers and packets. In such embodiments, each virtual router may be treated as a separate device node.

Yet in other embodiments, each ingress interface may only be connected to one egress interface. This can limit the search scope of candidate nodes for aggregation. In other embodiments, however, two or more interfaces may share the same subnet. For example, nodes to be aggregated may be internet service provider (ISP) devices or cloud service provider devices. In some embodiments, systematic naming conventions may be commonly used for router interfaces in backbone networks.

In certain embodiments, therefore, traceroute nodes may qualify for aggregation when the traceroute nodes do not belong to the same path, have a common succeeding node, and/or share the same DNS name suffix, and their name prefixes may fall into the same naming convention. The above embodiments allow the Node ID, and the number of Nodes within a given device, to be determined based on connectivity between nodes.

Figure 6:
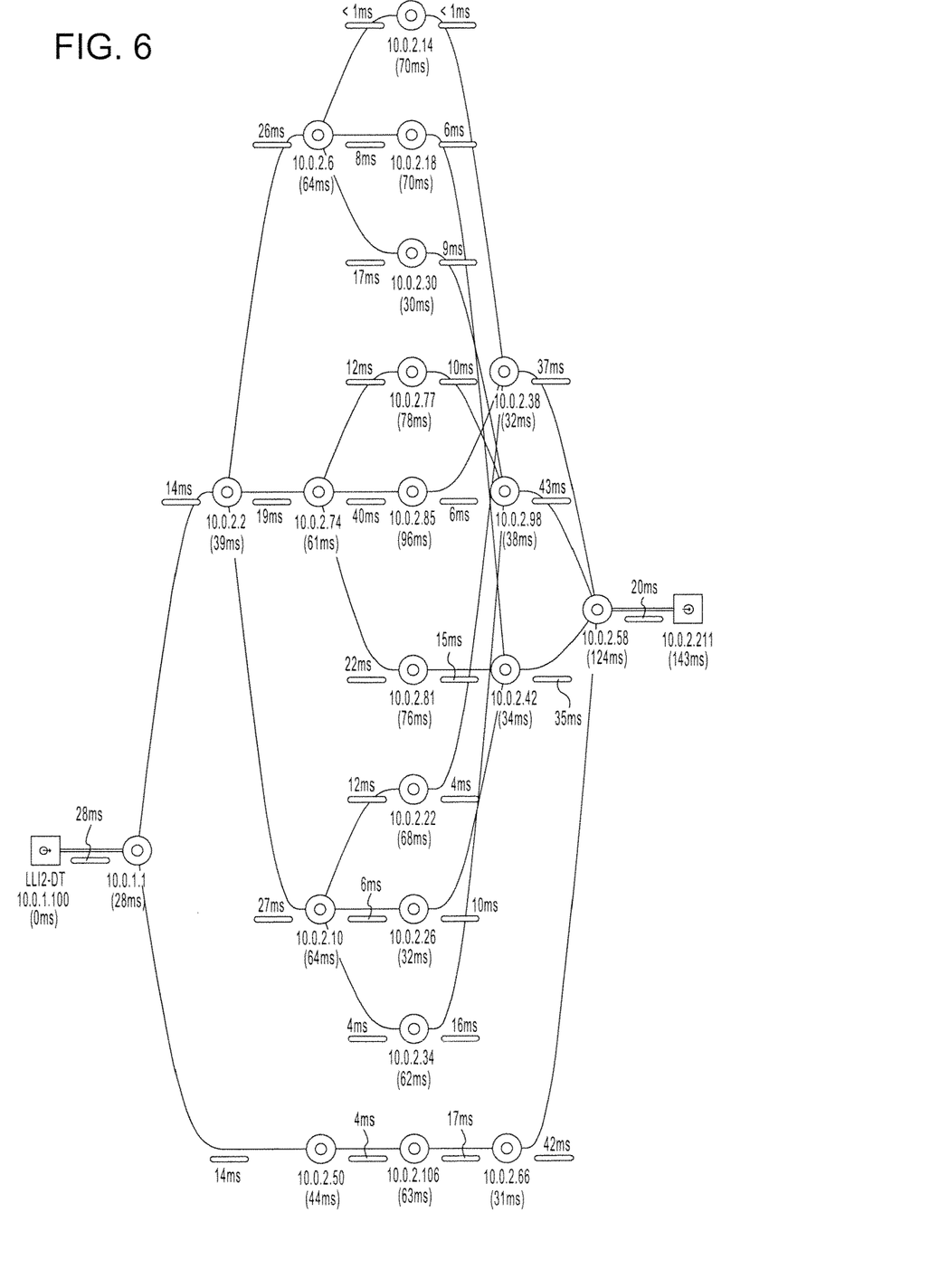
FIG. 6 illustrates a communication system according to certain embodiments.

FIG. 6 illustrates a communication system according to certain embodiments. In particular, FIG. 6 illustrates a graph of a multi-path network using a tracerouting probe. The probe attempts to trace paths from source node 610 to target node 620. The embodiment of FIG. 6 is a graph of paths before node aggregation has occurred. Node aggregation may mean aggregating the nodes in the graph into their respective devices. In other words, the nodes in the graphs have not yet been related to their corresponding devices, meaning that only nodes, not corresponding devices, are shown in the embodiment of FIG. 6.

Figure 7:
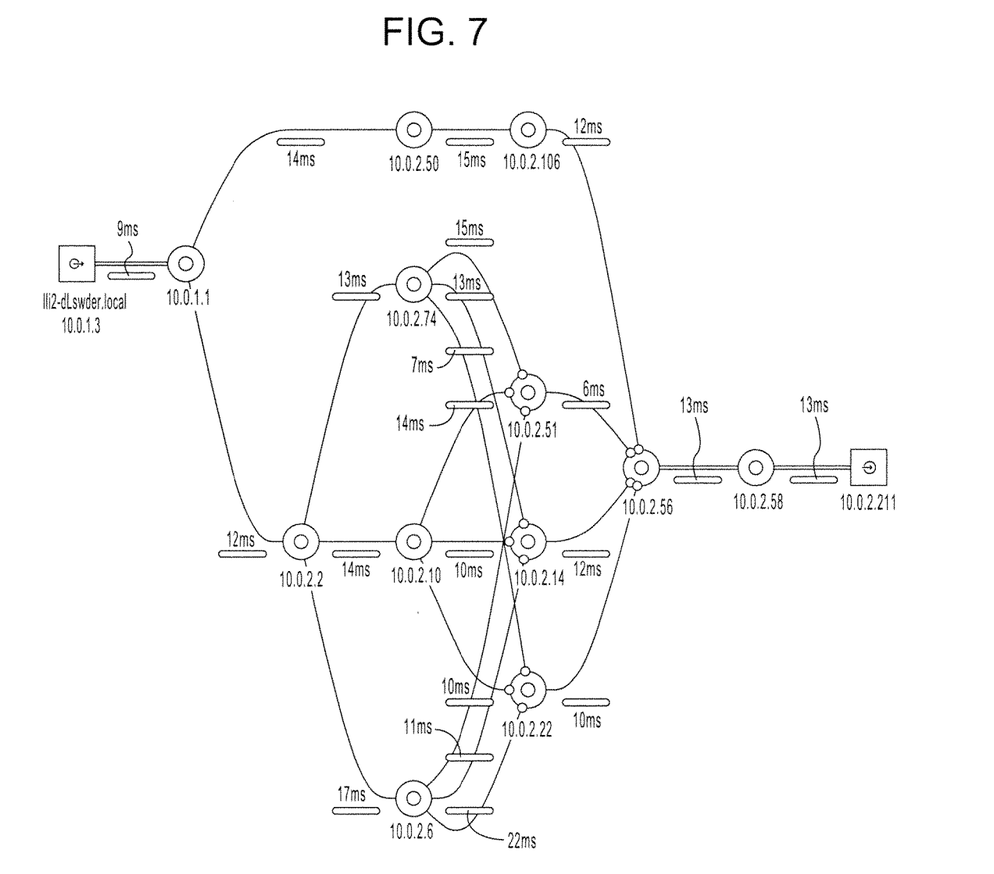
FIG. 7 illustrates a communication system according to certain embodiments.

FIG. 7 illustrates a communication system according to certain embodiments. In particular, FIG. 7 illustrates a graph of a multi-path network using a tracerouting probe. The probe attempts to trace paths from source node 710 to target node 720. Unlike the embodiment of FIG. 6, the embodiment of FIG. 7 is a graph of the multi-path network after node aggregation. In other words, the nodes in FIG. 7 have been related to their corresponding devices, and the corresponding devices, rather than individual nodes, are illustrated in the graph. As can be seen in FIG. 7, several devices include a plurality of network nodes.

Figure 8:
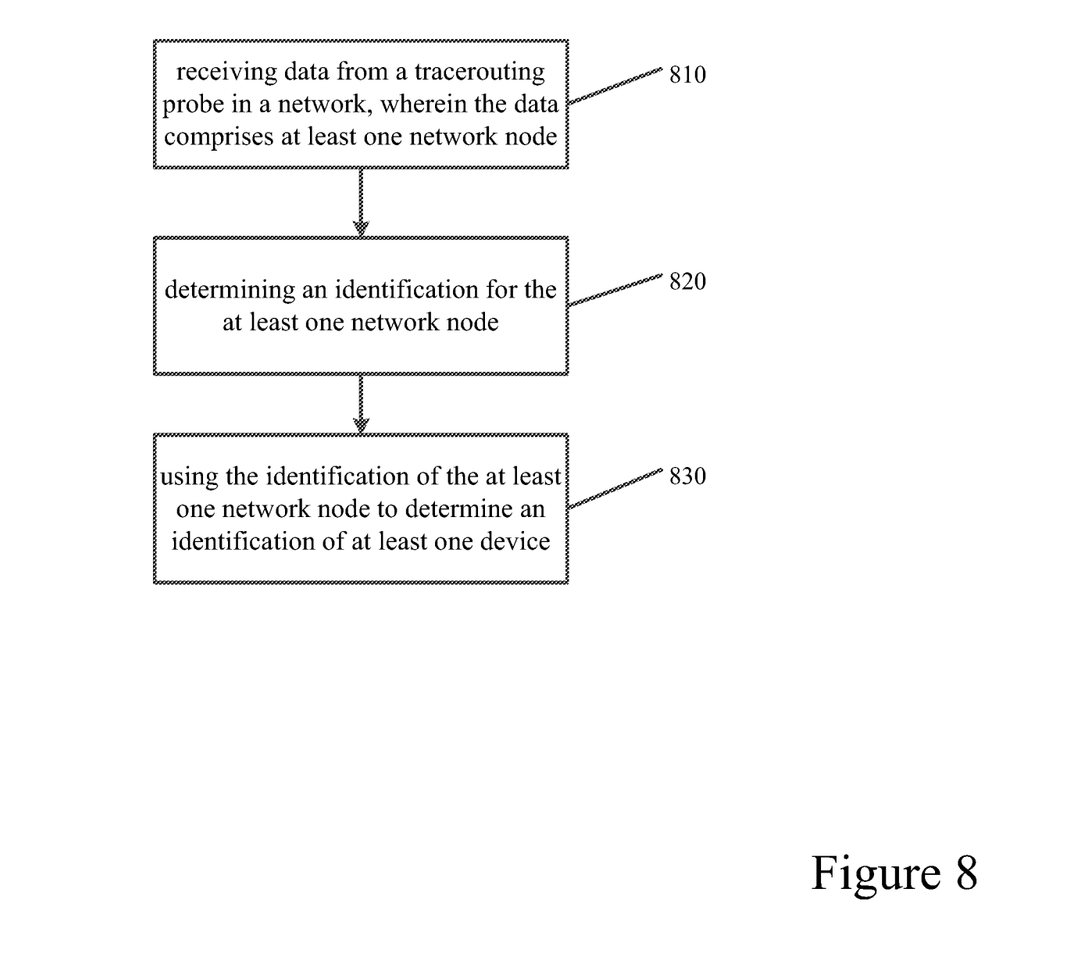
FIG. 8 illustrates a flow diagram according to certain embodiments.

FIG. 8 illustrates a flow diagram according to certain embodiments. Step 810 may describes receiving data at a source node from a tracerouting probe in a network. The data may include information about at least one network node. The information about the at least one network node may then be used to determine the identification of the at least one node, as shown in step 820. As shown in FIG. 5, the identification of the at least one node may be used to determine the identification of the edge. In step 830, the identification of the at least one network node may be used to determine an identification of at least one device. There may be a plurality of the at least one network node in one device. In other words, a single device may include multiple network nodes.

In certain embodiments, the identification of the at least one node may be based on an identification of a first network node, which precedes the at least one network node, an identification of a second network node, which is subsequent to the at least one network node, and/or a position of the network node between the first and second network nodes. In other embodiments, the identification of the at least one network node or the at least one device may be determined using information derived from a network management system, which may be an internal network. Further, in some embodiment, the identification of the at least one network node may be determined based on the ingress and egress interfaces.

Figure 9:
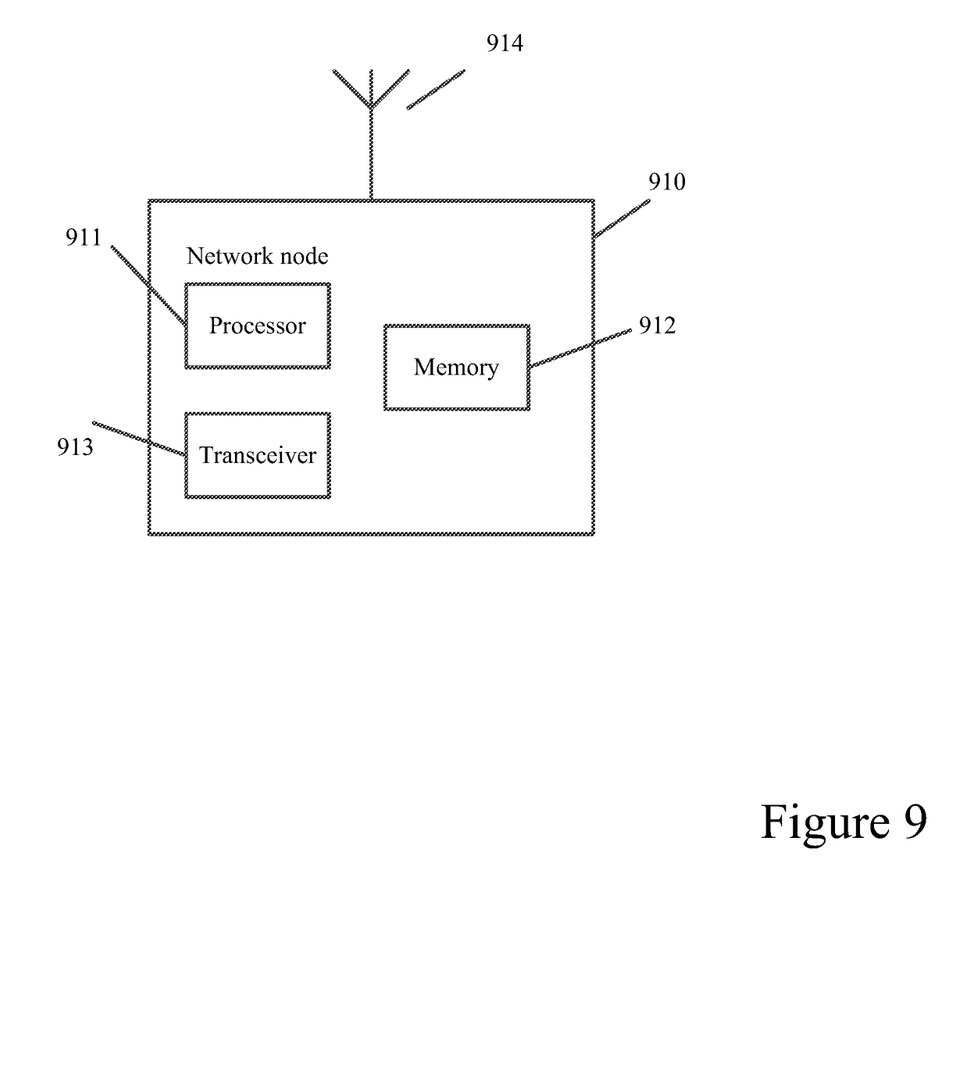
FIG. 9 illustrates a system according to certain embodiments.

FIG. 9 illustrates a system according to certain embodiments. It should be understood that each block in FIGS. 1-8 may be implemented by various means or their combinations, such as hardware, software, firmware, one or more processors and/or circuitry. In one embodiment, a system may include several devices, such as, for example, a network node 910. The system may include more than one network node 910. The network node may be a source node, a target node, an intermediate node, an access node, a base station, an eNodeB, 5G NB, server, host, router, or any of the other access or network node discussed herein.

Network node 910 may include at least one processor or control unit or module, indicated as 911. At least one memory may be provided as indicated by 912. The memory may include computer program instructions or computer code contained therein. One or more transceivers 913 may be provided, and each network node may also include an antenna, respectively illustrated in 914. Although only one antenna each is shown, many antennas and multiple antenna elements may be provided to each of the devices. Other configurations of the network node may be provided. For example, network node 910 may be additionally configured for wired communication, in addition to wireless communication, and in such a case antennas 914 may illustrate any form of communication hardware, without being limited to merely an antenna.

Transceivers 913 may independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

In some embodiments, an apparatus, such as network node 910, may include means for carrying out embodiments described above in relation to FIGS. 1-8. In certain embodiments, at least one memory including computer program code can be configured to, with the at least one processor, cause the apparatus at least to perform any of the processes described herein.

According to certain embodiments, an apparatus 910 may include at least one memory 912 including computer program code, and at least one processor 911. The at least one memory 912 and the computer program code are configured, with the at least one processor 911, to cause the apparatus 910 at least to receive data at a source node from a tracerouting probe in a network. The tracerouting probe detects edges. The at least one memory 912 and the computer program code may also be configured, with the at least one processor 911, to also cause the apparatus 910 at least to calculate an edge completion ratio based on the edges. In addition, the at least one memory 912 and the computer program code may be configured, with the at least one processor 911, to cause the apparatus 910 at least to terminate the probe when the edge completion ratio is greater than or equal to a threshold.

According to certain embodiments, an apparatus 910 may include at least one memory 912 including computer program code, and at least one processor 911. The at least one memory 912 and the computer program code are configured, with the at least one processor 911, to cause the apparatus 910 at least to receive identification information of a first network node in a multi-path route. The at least one memory 912 and the computer program code may also be configured, with the at least one processor 911, to also cause the apparatus 910 at least to receive identification information of a second network node in the multi-path route. In addition, the at least one memory 912 and the computer program code may be configured, with the at least one processor 911, to cause the apparatus 910 at least to determine an identification of an edge based on the identification information of the first network node and the identification information of the second network node.

Processor 911 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memory 912 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 910, to perform any of the processes described above (see, for example, FIGS. 1-8). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

As discussed above, certain embodiments can utilize an edge completion ratio to estimate a complete network topology. Once the edge completion ratio is determined to be equal to or greater than a certain threshold, the tracerouting probing of the network may be terminated. This can be used to preserve network resources, and make the tracing or mapping of the network topology more efficient.

Estimating the complete network topology can help monitor end-to-end network performance. Monitoring, evaluation, and diagnosing the end-to-end network performance can help a network operator or a certain network node make various decisions relating to the performance of the network. For example, the node may make latency decisions and shift network resources based on the estimated network topology. Thus, the above embodiments provide significant improvements to the functioning of a network and/or to the functioning of the nodes or computers within the network.

In addition, certain embodiment may allow for determining not only the nodes in a network, but also the devices associated with such nodes. In particular, it may be possible to determine the number of nodes within each device, and thereby, the number of devices in the network. This may allow for a graph produced by a tracerouting probe to be reduced to a graphs that includes Nodes IDs, Edge IDs, and different devices.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. The communication systems discussed above may be implemented in Third Generation Partnership (3GPP) technology, such as Long Term Evolution (LTE), LTE-advanced (LTE-A), $3^{rd}$ generation technology (3G), $4^{th}$ generation technology (4G), $5^{th}$ generation technology (5G), or any other IP Multimedia System (IMS).

Partial Glossary

S.E. standard error

N' an estimation for total number of unique edges from the source node to the target node.

$n_i$ the total number of unique edges caught at test i.

$m_i$ the number of recaptured unique edges during test i.

c the total number of calculations.

We claim:

1. A method comprising:
    receiving data at a source node from a tracerouting probe in a network, wherein the data comprises information about at least one network node;
    determining an identification for the at least one network node based on information;
    using the identification of the at least one network node to determine an identification of at least one device; and
    estimating a network topology of the network based upon a network topology completion ratio,
    wherein the network topology completion ratio is based upon an indication of a number of unique edges found in the network.

2. A method according to claim 1, further comprising:
    receiving an identification of a first network node of the at least one network node in a multi-path route;
    receiving an identification of a second network node of the at least one network node in the multi-path route; and
    determining an identification of an edge based on the identification information of the first network node and the identification information of the second network node.

3. The method according to claim 1, wherein the identification of the at least one network node is at least one of public, private, or unavailable.

4. The method according to claim 1, wherein a plurality of the at least one network node exist in one of the at least one device.

5. The method according to claim 4, further comprising:
    determining the identification of the at least one network node based on a position of the at least one network node between the first network node and the second network node.

6. The method according to claim 5, wherein the identification of the at least one network node and the at least one device are defined using an internet protocol (IP) address, and wherein the network management system comprises a list or an array of the IP addresses of the at least one network node and the at least one device.

7. The method according to claim 6, further comprising:
    determining an egress identification of another of the at least one network node or the at least one device using the ingress identification.

8. The method according to claim 4, wherein a first prefix of the first network node and a second prefix of the second network node are used for the determining the identification of the at least one network node.

9. The method according to claim 1, further comprising:
determining the identification of the at least one network node based on an identification of a first network node, which precedes the at least one network node, and an identification of a second network node, which is subsequent to the at least one network node.

10. The method according to claim 1, further comprising:
determining at least one of the identification of the at least one network node or the at least one device using information derived from a network management system.

11. The method according to claim 1, wherein the received data at the source node from the tracerouting probe comprises an identification of an ingress interface of at least one of the at least one network node or the at least one device.

12. The method according to claim 11, wherein the ingress identification may be used to determine a plurality of the egress identification.

13. The method according to claim 11, wherein the egress identification is determined using a network management system.

14. The method according to claim 11, wherein the egress identification is determined based on the similarity of the egress identification to the ingress identification.

15. The method according to claim 1, wherein the identification of the at least one node is at least one of an IP address or a domain name server list.

16. An apparatus comprising:
at least one memory comprising computer program code;
at least one processor;
wherein the at least one memory and the computer program code are configured, with the at least one processor, to cause the apparatus at least to:
receive data at a source node from a tracerouting probe in a network, wherein the data comprises information about at least one network node;
determine an identification for the at least one network node based on information;
use the identification of the at least one network node to determine an identification of at least one device; and
estimate a network topology of the network based upon a network topology completion ratio,
wherein the network topology completion ratio is based upon an indication of a number of unique edges found in the network.

17. The apparatus according to claim 16, wherein the at least one memory and the computer program code are also configured, with the at least one processor, to cause the apparatus at least to:
receive an identification of a first network node of the at least one network node in a multi-path route;
receive an identification of a second network node of the at least one network node in the multi-path route; and
determine an identification of an edge based on the identification information of the first network node and the identification information of the second network node.

18. The apparatus according to claim 16, wherein the identification of the at least one network node is at least one of public, private, or unavailable.

19. The apparatus according to claim 16, the at least one network node exist in one of the at least one device.

20. The apparatus according to claim 16, wherein the at least one memory and the computer program code are also configured, with the at least one processor, to cause the apparatus at least to:
determine the identification of the at least one network node based on an identification of a first network node, which precedes the at least one network node, and an identification of a second network node, which is subsequent to the at least one network node.

21. The apparatus according to claim 20, wherein the at least one memory and the computer program code are also configured, with the at least one processor, to cause the apparatus at least to:
determine the identification of the at least one network node based on a position of the at least one network node between the first network node and the second network node.

22. The apparatus according to claim 20, wherein a first prefix of the first network node and a second prefix of the second network node are used for the determining the identification of the at least one network node.

23. The apparatus according to claim 16, wherein the at least one memory and the computer program code are also configured, with the at least one processor, to cause the apparatus at least to:
determine at least one of the identification of the at least one network node or the at least one device using information derived from a network management system.

24. The apparatus according to claim 23, wherein the identification of the at least one network node and the at least one device are defined using an IP address, and wherein the network management system comprises a list or an array of the IP addresses of the at least one network node and the at least one device.

25. The apparatus according to claim 16, wherein the received data at the source node from the tracerouting probe comprises an identification of an ingress interface of at least one of the at least one network node or the at least one device.

26. The apparatus according to claim 25, wherein the at least one memory and the computer program code are also configured, with the at least one processor, to cause the apparatus at least to:
determine an egress identification of another of the at least one network node or the at least one device using the ingress identification.

27. The apparatus according to claim 26, wherein the ingress identification may be used to determine a plurality of the egress identification.

28. The method according to claim 26, wherein the egress identification is determined using a network management system.

29. The apparatus according to claim 26, wherein the egress identification is determined based on the similarity of the egress identification to the ingress identification.

30. The apparatus according to claim 16, wherein the identification of the at least one node is at least one of an IP address or a domain name server list.

31. A non-transitory computer-readable medium encoding instructions that, when executed in hardware, perform a process, the process comprising:
receiving data at a source node from a tracerouting probe in a network, wherein the data comprises information about at least one network node;
determining an identification for the at least one network node based on information;
using the identification of the at least one network node to determine an identification of at least one device; and
estimating a network topology of the network based upon a network topology completion ratio, wherein the network topology completion ratio is based upon an indication of a number of unique edges found in the network.

* * * * *